United States Patent
AlMustafa et al.

(10) Patent No.: US 12,468,058 B2
(45) Date of Patent: Nov. 11, 2025

(54) THERMAL CONDUCTIVITY MAPPING FROM ROCK PHYSICS GUIDED SEISMIC INVERSION

(71) Applicant: Saudi Arabian Oil Company, Dhahran (SA)

(72) Inventors: Husam M. AlMustafa, Dhahran (SA); Rudi Lubbe, Dhahran (SA); Muhammad Ashfaq, Dhahran (SA); Norah S. Aldossary, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 436 days.

(21) Appl. No.: 17/876,223

(22) Filed: Jul. 28, 2022

(65) Prior Publication Data

US 2024/0036225 A1    Feb. 1, 2024

(51) Int. Cl.
| | |
|---|---|
| *G01V 1/30* | (2006.01) |
| *G01V 1/28* | (2006.01) |
| *G01V 1/32* | (2006.01) |
| *G01V 1/34* | (2006.01) |

(52) U.S. Cl.
CPC ............ *G01V 1/306* (2013.01); *G01V 1/282* (2013.01); *G01V 1/325* (2013.01); *G01V 1/345* (2013.01); *G01V 2210/6224* (2013.01); *G01V 2210/74* (2013.01)

(58) Field of Classification Search
CPC ........ G01V 1/306; G01V 1/282; G01V 1/325; G01V 1/345
See application file for complete search history.

(56) References Cited

U.S. PATENT DOCUMENTS

| | | | |
|---|---|---|---|
| 8,577,660 B2 * | 11/2013 | Wendt | G01V 1/28 703/7 |
| 2011/0015912 A1 | 1/2011 | Oppert et al. | |
| 2011/0264430 A1 * | 10/2011 | Tapscott | G01V 99/00 703/10 |

FOREIGN PATENT DOCUMENTS

WO    WO-2014173436 A1 *   10/2014    ............. G01V 1/306

OTHER PUBLICATIONS

Benkhayal et al., "Sediment thermal conductivity derived from seismic interval velocity: Tonga Block, Central Sumatra Basin," SEG Technical Program Expanded Abstracts, Sep. 2020, 4 pages.
Kukkonen et al., "Inverse Temperature Gradient Method for Estimating Thermal Conductivity in Drillholes—Working Report 2011-79," Nov. 2011, 34 pages.

(Continued)

*Primary Examiner* — Lam S Nguyen
(74) *Attorney, Agent, or Firm* — Fish & Richardson P.C.

(57) ABSTRACT

Modeling basin geology in a subsurface region includes receiving seismic data representing acoustic signals that are reflected from regions of the subsurface; receiving potential fields data comprising potential field values that are mapped to locations in the subsurface; determining a relationship between the seismic data and the potential field values for each of the locations in the subsurface; generating, based on the relationship for each location, a three-dimensional (3D) map of thermal conductivity in the subsurface region; and based on the 3D map of thermal conductivity, identifying at least one area comprising source rock having a threshold maturity, the threshold maturity indicative of potential hydrocarbons in the subsurface.

15 Claims, 8 Drawing Sheets

(56) References Cited

OTHER PUBLICATIONS

Wahid et al., "The Empirical Relationship Acoustic Impedance and Thermal Conductivity," Dissertation submitted in partial fulfilment of the requirements for the Bachelor of Engineering (Hons) (Petroleum Engineering), Jan. 2011, 38 pages.
PCT International Search Report and Written Opinion in International Appln. No. PCT/US2023/070384, dated Oct. 5, 2023, 25 pages.
Bayuk et al., "Rock-Physics Based Prediction of Hydraulic Permeability and Thermal Conductivity of Anisotropic Clastic Rocks from Logging Data," SEG International Exposition and 87th Annual Meeting, 2016, 3154-3158, 5 pages.
Duffaut et al., "A simple relationship between thermal conductivity and seismic interval velocity," The Leading Edge, May 2018, 37(5):381-385, 5 pages.
Sarkar et al., "Subsurface temperature from seismic reflection data: application to the post break up sequence offshore Namibia," AAPG Bulletin, 2021, 42 pages.

* cited by examiner

THERMAL CONDUCTIVITY MAPPING FROM ROCK PHYSICS GUIDED SEISMIC INVERSION

TECHNICAL FIELD

The present specification generally relates to an approach for modeling features in a subterranean formation. More specifically, this specification describes systems and methods for basin modeling based on estimations of thermal conductivity of rock formations.

BACKGROUND

Hydrocarbons, such as oil and gas, occur in the Earth's subsurface at a depth ranging from a few hundred meters to several kilometers and are found in geological formations, which are layers of rock. As such, prospecting for hydrocarbons includes the difficult tasks of identification of where such geological formations exist and extraction of the hydrocarbons from these geological formations at such depths. Identifying the location of hydrocarbons may include the conducting of geophysical surveys collected through, for example, seismic prospecting. These geophysical surveys can be employed to construct geological maps representing the structure of areas of the outer crust of the Earth.

SUMMARY

The present specification describes systems and processes for modeling a basin in a subsurface. A computing system (e.g., a data processing system) is configured to execute a procedure for thermal conductivity estimation. The computing system improves measurements for the parameter of thermal conductivity. Thermal conductivity includes a parameter describing a source rock maturity. In an example, thermal conductivity is a rate at which heat is transferred by conduction through a unit cross-section area of a rock material, such as when a temperature gradient exits perpendicular to the area. Seismic data and thermal conductivity are physically related (e.g., due to porosity of rock in the subsurface), and can strongly correlate to one another. As a result, the data processing system described in this specification can perform a more accurate estimation of thermal conductivity to generate more accurate models of basin geology.

The systems and methods for procedure for thermal conductivity estimation to determine values for elastic attributes of seismic waves for three dimensional (3D) areal distribution of seismic data. The data processing system determines properties for both primary waves (P-waves) and secondary waves (S-waves) of the seismic data. P-waves include compressional waves that are longitudinal in nature. P-waves include pressure waves that travel faster than other waves through the earth to arrive at seismograph stations before S-waves. S-waves include shear waves that are transverse in nature. S-waves (e.g., generated in a seismic signal) arrive at seismograph stations after the faster-moving P-waves and displace the ground perpendicular to the direction of propagation. The elastic properties for the S-waves and P-waves can include parameters such as attenuation factor and illustrate the elastic properties of the rock at the basin, such as the relation between deformation and stress defined by the elastic constant(s) of the rock(s) at the basin. The data processing system models the basin geology based on the estimate of these elastic parameters.

Currently, default values from tables are used as inputs for basin modeling. Generally, basin modeling uses thermal conductivity values as inputs for predictions of basin structure. The determined elastic parameters from the seismic data provide a more accurate model relative to using default values from tables, the values being representative of the region. For example, the system performs heat flow prediction by combining thermal conductivity and temperature gradient data using Fourier's Law $q=-k\nabla T$, where $q$ is the local heat flux density in Watts per meter squared, $k$ is the material's conductivity in Watts per meter-Kelvin, and $\nabla T$ is the temperature gradient in Kelvins per meter.

Additionally, the processes and systems described in this specification provide a three-dimensional (3D) map of thermal conductivity. The mapping is based on a rock physics transform that relates seismic inversion elastic attributes to thermal conductivity. The systems and methods are configured to provide a visualization of how thermal conductivity varies horizontally and vertically in the subsurface. The visualization also shows how thermal conductivity varies in relation to facies in the subsurface that are predicted from seismic inversion models.

The implementations described herein enable one or more of the following advantages. The systems and processes described in this specification provide a more accurate estimate of thermal conductivity relative to models that use default elastic parameter values for seismic data. For example, the rock-physics based seismic inversion process described in this specification bypasses uncertainties that are embedded in a conventional P-wave velocity method that depends on the calculation of interval velocities from stacking velocities. The resulting 3D map of thermal conductivity increases an efficiency of source rock maturity analysis, resulting in risk mitigation for drilling. For example, a risk that unproductive wells are drilled is reduced because the improved basin models have more accurate source rock thermal maturity values. The 3D map enables exploration concentration on areas of mature source rock. Wells are not drilled in areas where the source rock is not mature enough to generate hydrocarbons. Additionally, the 3D map of thermal conductivity provides evidence for basin evolution in the subsurface region. The 3D map of thermal conductivity provides additional data illustrating the process of hydrocarbon maturation in a region. Furthermore, the 3D map of thermal conductivity illustrates a geothermal condition of a geologic setting.

Each of these advantages are enabled by one or more of the following embodiments.

In a general aspect, a method is performed for modeling basin geology in a subsurface region. The method includes receiving seismic data representing acoustic signals that are reflected from regions of the subsurface region. The method includes receiving potential fields data comprising potential field values that are mapped to locations in the subsurface region. The method includes determining a relationship between the seismic data and the potential field values for each of the locations in the subsurface region. The method includes generating, based on the relationship for each of the locations, a three-dimensional (3D) map of thermal conductivity in the subsurface region. The method includes, based on the 3D map of thermal conductivity, identifying at least one area comprising source rock having a threshold maturity, the threshold maturity being indicative of potential hydrocarbons in the subsurface region.

In some implementations, the method includes determining a temperature curve in a zone of interest based on the potential field values. In some implementations, the method includes estimating a temperature gradient for each layer of a subsurface formation in the subsurface region from the temperature curve. In some implementations, the relationship between the seismic data and the potential field values for each of the locations in the subsurface region is based on the temperature gradient for a respective layer of subsurface formation.

In some implementations, the method includes determining a thermal conductivity for each layer of the subsurface formation from the temperature gradient for the respective layer of the subsurface formation.

In some implementations, the method includes performing a seismic inversion on the seismic data. In some implementations, the method includes generating, based on the seismic inversion, values for one or more elastic properties of the subsurface region. In some implementations, the relationship between the seismic data and the potential field values for each of the locations in the subsurface region comprises a relationship between the thermal conductivity of the subsurface region and the one or more elastic properties.

In some implementations, the one or more elastic properties comprise lithology, porosity, water saturation, permeability and density. In some implementations, the method includes determining, based on the seismic inversion, an acoustic impedance across the subsurface region. In some implementations, the method includes generating a rock physics template (RPT) based on relating the acoustic impedance to thermal conductivity in the subsurface region. In some implementations, the method includes, based on the RPT, propagate thermal conductivity values through the subsurface region to form the 3D map of thermal conductivity.

In some implementations, the potential fields data comprises production logging tool (PLT) data, downhole seismic testing (DST) data, bottom hole temperature (BHT) log data, or a combination thereof.

In some implementations, the method includes drilling a well based on identifying at least one area comprising source rock having a threshold maturity.

In a general aspect, a system for modeling basin geology in a subsurface region includes at least one processor at least one memory storing instructions that, when executed by the at least one processor, cause the at least one processor to perform operations. The operations include receiving seismic data representing acoustic signals that are reflected from regions of the subsurface region. The operations include receiving potential fields data comprising potential field values that are mapped to locations in the subsurface region. The operations include determining a relationship between the seismic data and the potential field values for each of the locations in the subsurface region. The operations include generating, based on the relationship for each of the locations, a three-dimensional (3D) map of thermal conductivity in the subsurface region. The operations include, based on the 3D map of thermal conductivity, identifying at least one area comprising source rock having a threshold maturity, the threshold maturity being indicative of potential hydrocarbons in the subsurface region.

In some implementations, the operations include determining a temperature curve in a zone of interest based on the potential field values. In some implementations, the operations include estimating a temperature gradient for each layer of a subsurface formation in the subsurface region from the temperature curve. In some implementations, the relationship between the seismic data and the potential field values for each of the locations in the subsurface region is based on the temperature gradient for a respective layer of subsurface formation.

In some implementations, the operations include determining a thermal conductivity for each layer of the subsurface formation from the temperature gradient for the respective layer of the subsurface formation.

In some implementations, the operations include performing a seismic inversion on the seismic data. In some implementations, the operations include generating, based on the seismic inversion, values for one or more elastic properties of the subsurface region. In some implementations, the relationship between the seismic data and the potential field values for each of the locations in the subsurface region comprises a relationship between the thermal conductivity of the subsurface region and the one or more elastic properties.

In some implementations, the one or more elastic properties comprise lithology, porosity, water saturation, permeability and density. In some implementations, the operations include determining, based on the seismic inversion, an acoustic impedance across the subsurface region. In some implementations, the operations include generating a rock physics template (RPT) based on relating the acoustic impedance to thermal conductivity in the subsurface region. In some implementations, the operations include, based on the RPT, propagate thermal conductivity values through the subsurface region to form the 3D map of thermal conductivity.

In some implementations, the potential fields data comprises production logging tool (PLT) data, downhole seismic testing (DST) data, bottom hole temperature (BHT) log data, or a combination thereof.

In some implementations, the operations include drilling a well based on identifying at least one area comprising source rock having a threshold maturity.

In a general aspect, one or more non-transitory computer-readable media store instructions for modeling basin geology in a subsurface region. The instructions, when executed by at least one processor, are configured to cause the at least one processor to perform operations. The operations include receiving seismic data representing acoustic signals that are reflected from regions of the subsurface region. The operations include receiving potential fields data comprising potential field values that are mapped to locations in the subsurface region. The operations include determining a relationship between the seismic data and the potential field values for each of the locations in the subsurface region. The operations include generating, based on the relationship for each of the locations, a three-dimensional (3D) map of thermal conductivity in the subsurface region. The operations include, based on the 3D map of thermal conductivity, identifying at least one area comprising source rock having a threshold maturity, the threshold maturity being indicative of potential hydrocarbons in the subsurface region.

In some implementations, the operations include determining a temperature curve in a zone of interest based on the potential field values. In some implementations, the operations include estimating a temperature gradient for each layer of a subsurface formation in the subsurface region from the temperature curve. In some implementations, the relationship between the seismic data and the potential field values for each of the locations in the subsurface region is based on the temperature gradient for a respective layer of subsurface formation.

In some implementations, the operations include determining a thermal conductivity for each layer of the subsurface formation from the temperature gradient for the respective layer of the subsurface formation.

In some implementations, the operations include performing a seismic inversion on the seismic data. In some implementations, the operations include generating, based on the seismic inversion, values for one or more elastic properties of the subsurface region. In some implementations, the relationship between the seismic data and the potential field values for each of the locations in the subsurface region comprises a relationship between the thermal conductivity of the subsurface region and the one or more elastic properties.

In some implementations, the one or more elastic properties comprise lithology, porosity, water saturation, permeability and density. In some implementations, the operations include determining, based on the seismic inversion, an acoustic impedance across the subsurface region. In some implementations, the operations include generating a rock physics template (RPT) based on relating the acoustic impedance to thermal conductivity in the subsurface region. In some implementations, the operations include, based on the RPT, propagate thermal conductivity values through the subsurface region to form the 3D map of thermal conductivity.

In some implementations, the potential fields data comprises production logging tool (PLT) data, downhole seismic testing (DST) data, bottom hole temperature (BHT) log data, or a combination thereof.

In some implementations, the operations include drilling a well based on identifying at least one area comprising source rock having a threshold maturity.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The details of one or more embodiments are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
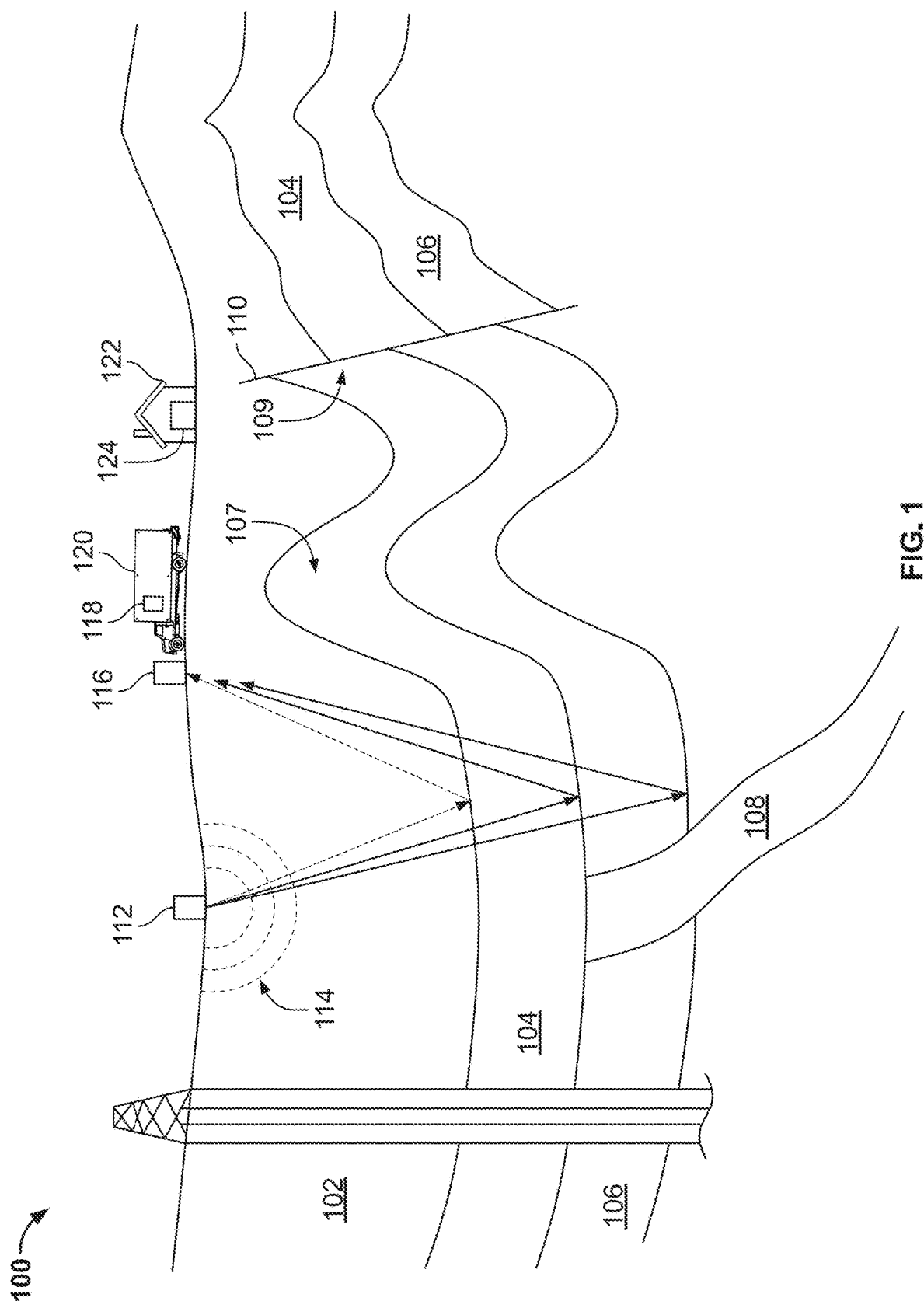
FIG. 1 is a schematic view of seismic and potential fields surveys being performed to map subterranean features such as facies, faults, and layers.

This disclosure describes data processing systems and processes for modeling basin geology in a subsurface region. A computing system (e.g., a data processing system) receives seismic data from a seismic receiver, as subsequently described. The computing system performs seismic inversion. The computing system estimates thermal conductivity and generates a three dimensional map of thermal conductivity in the subsurface region. Thermal conductivity includes a parameter describing a source rock maturity in the subsurface region. Thermal conductivity is a rate at which heat is transferred by conduction through a unit cross-section area of a rock material, such as when a temperature gradient exits perpendicular to the area. Seismic data and thermal conductivity are physically related because of porosity of rock in the subsurface. Velocity values measured in the traces of seismic data correlate to thermal conductivity values of the rock. The computing system performs a more accurate estimation of thermal conductivity to generate more accurate models of basin geology, relative to estimates of thermal conductivity performed using default values that are derived from rock properties of the subsurface region.

The computing system described in this specification uses thermal conductivity as a parameter to estimate source rock maturity. Rather than default values from tables as input to basin analysis, the computing system is configured to determine values of elastic attributes from seismic data. Specifically, the computing system uses a 3D areal distribution of seismic data, as subsequently described. The computing system executes a process that uses each of petrophysics, rock physics and seismic inversion. The computing system uses petrophysics to determine formation temperatures using production logging tool (PLT) data, drill stem test (DST) data, and bottom hole temperature (BHT) log data. The computing system uses these data to determine a temperature curve in a zone of interest. The computing system estimates a temperature gradient for each layer of the subsurface formation from the temperature data. The computing system determines a thermal conductivity for each layer from the temperature gradient. The computing system generates data representing relationships between thermal conductivity and elastic properties using rock physics transforms (RPT) for the subsurface region. The computing system then uses 3D seismic data (such as from seismic inversion) to produce an areal map of thermal conductivity using RPT. The computing system then estimates source rock maturity from the areal map of thermal conductivity. The source rock maturity and areal map of thermal conductivity are each used, such as during hydrocarbon exploration, for drilling risk mitigation. For example, areas with older source rock (or more mature source rock) are more likely to yield hydrocarbon deposits. When rock maturity exceeds a minimum threshold representing a required rock maturity, it is possible for that region to include hydrocarbons such as oil or gas. This process is subsequently described in greater detail with respect to the figures.

FIG. 1 is a schematic view of a seismic survey being performed to map subterranean features such as facies and faults in a subterranean formation 100. The seismic survey can provide the underlying basis for implementation of the systems and methods described herein. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow along with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends on several properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also be display results of the analysis of the seismic data associated with the seismic survey.

A basement sediment interface 123 is mapped by the computer system 124. A magnetic method is one example of a potential fields technique for mapping the basement-sediment interface 123. This is because sediment rocks have low magnetic susceptibility compared to those of the basement rocks. Potential fields surveys can take place on land, airborne sensors supported by a plane 125, and using marine sensors (not shown). Airborne acquisition of potential fields data is the most common in oil and gas exploration. The resolution depends on flight line spacing and a flight altitude of the plane 125.

Figure 2:
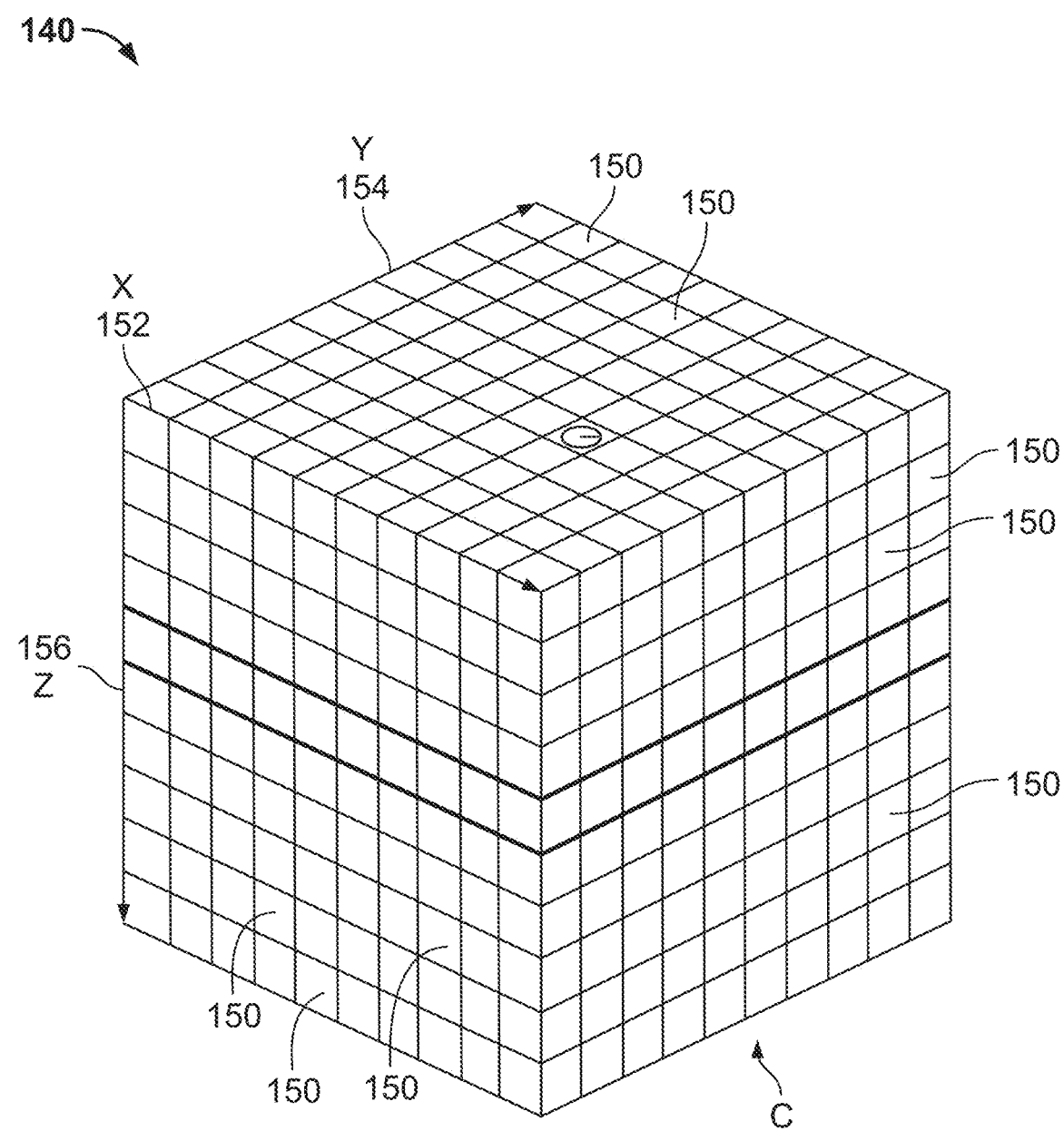
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
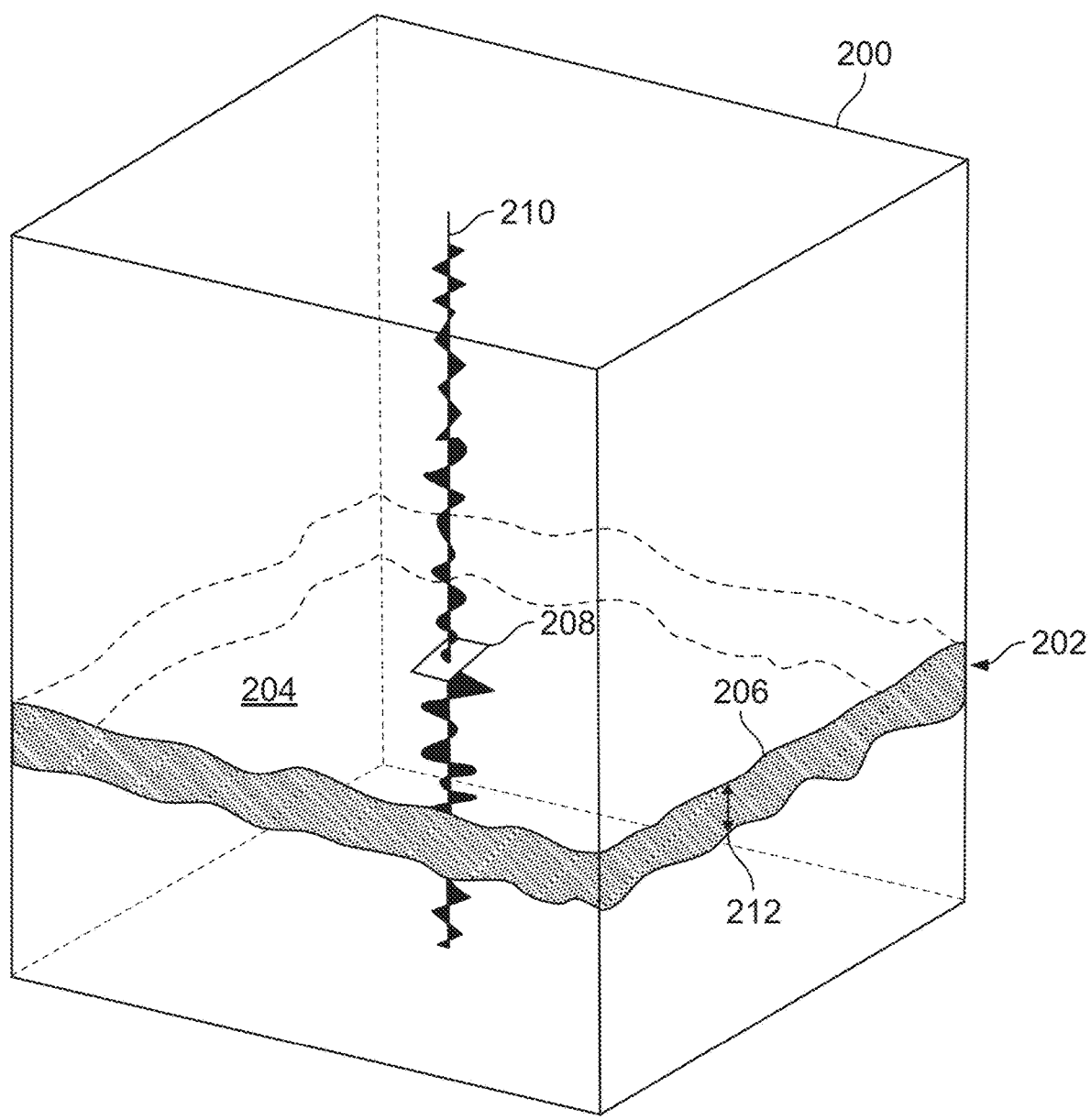
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4:
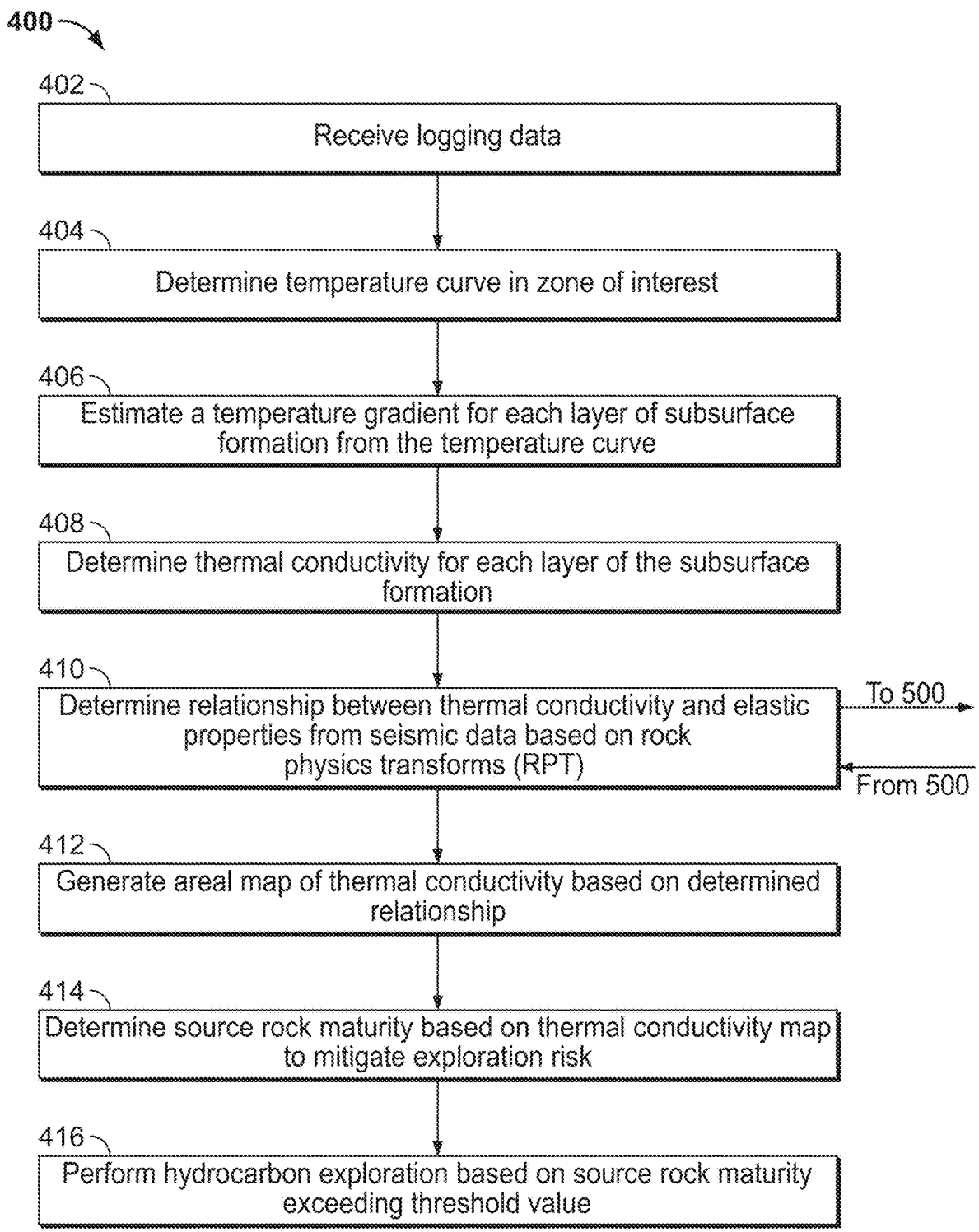
FIG. 4 is a flowchart of an example of a process for determining source rock maturity from seismic data and a rock physics transform that relates seismic inversion elastic attributes of the seismic data to thermal conductivity in the subsurface.

FIG. 4 is a flowchart of an example of a process 400 for modeling basin geology in a subsurface region. The process 400 can be performed by a data processing system, such as the computing system 700 described in relation to FIG. 7, or the computer system 124 described in relation to FIG. 1. The computing system executes a process 400 that uses each of petrophysics, rock physics and seismic inversion.

The computing system receives (402) logging data including PLT log data, DST log data, and BHT log data. A typical resolution of PLT/BHT logs is ~0.5 foot (ft.) or 1 ft. in a wellbore in which the logging is performed. In some implementations, each of the logs are acquired using a string of measurement tools that are inserted in the borehole. For DST log data, the sensors acquire stationary measurements including a representation of a reservoir pressure across a zone of interest in the subsurface formation. In some implementations, other auxiliary measurements can also be performed. In some implementations, the auxiliary measurements include data from a repeat formation tester (RFT). RFT measurements include fluid pressures measured with a wireline. A padded tool seals formations and pumps fluid until resistivity indexes indicate formation fluids are present. The RFT sensors measure temperature and pressure and recovers a fluid sample. In some implementations, the auxiliary measurements include modular formation dynamics tester (MDT) measurements. MDT measurements include real-time flowline resistivity measurements at the probe module to discriminate between formation fluids and filtrate from water- and oil-based muds. Until an acceptably low level of contamination can be recovered, formation fluid is excluded from sample recovery Each of RFT and MDT measurements are used to calibrate the pressure data within the borehole. In an example, LiDAR point data are shown in Table 1 showing temperature data along with other measurements in a sample borehole. Here, Table 1 shows temperature data for a well in degrees Fahrenheit.

TABLE 1

Temperature Data for Example Well

| Depth (Feet) | Temperature (F.) |
|---|---|
| 12001 | 270.2831 |
| 12002 | 270.2842 |
| 12003 | 270.2859 |
| 12004 | 270.2825 |
| 12005 | 270.2909 |
| 12006 | 270.2867 |
| 12007 | 270.2851 |
| 12008 | 270.2804 |
| 12009 | 270.2844 |
| 12010 | 270.289 |
| 12011 | 270.2916 |
| 12012 | 270.2853 |
| 12013 | 270.2878 |
| 12014 | 270.2896 |
| 12015 | 270.2895 |
| 12016 | 270.2862 |
| 12017 | 270.2874 |
| 12018 | 270.2898 |

As described herein, petrophysics includes physical and chemical properties of rocks and their contained fluids. The computing system uses the logging data described herein to determine the rock properties of the reservoir, particularly how pores in the subsurface are interconnected, and how the pore network controls the accumulation and migration of hydrocarbons. The property values determined by the computing system include lithology, porosity, water saturation, permeability and density. For temperature measurements, most of the tools acquiring well logs measure the borehole temperature as an auxiliary measurement. Alternatively, if the temperature measurements in the borehole are not available, the computing system performs temperature gradient conversions to estimate borehole temperature. For example, a temperature gradient conversion is shown as follows: 1 degree Fahrenheit per 100 feet is equal to 1.823 degrees Celsius per 100 meters. Conversely, 1 degree Celsius per 100 meters is 0.5486 degrees Fahrenheit per 100 feet.

The computing system uses these data to determine (404) a temperature curve in a zone of interest (such as the seismic volume of FIG. 2). The computing system estimates (406) a temperature gradient for each layer of the subsurface formation from the temperature curve. The temperature gradient is determined using Fourier's Law $q=-k\nabla T$, where q is the local heat flux density in Watts per meter squared, k is the material's conductivity in Watts per meter-Kelvin, and $\nabla T$ is the temperature gradient in Kelvins per meter.

The computing system determines (408) a thermal conductivity for each layer of the subsurface formation from the temperature gradient. The thermal conductivity is the ratio of a rate of heat flow per unit area to a negative value of the temperature gradient.

The computing system generates (410) data representing relationships between thermal conductivity and elastic properties using rock physics transforms (RPT) for the subsurface formation. Generally, this process, described in detail with respect to FIGS. 5A-5B, includes relating thermal conductivity to seismic inversion values acquired from seismic measurements. For example, acoustic impedance is an elastic property that can be used to build a rock physics template. This template relates acoustic impedance to thermal conductivity in a linear or non-linear relationship.

The computing system then uses 3D seismic data (such as from seismic inversion) to generate (412) an areal map of thermal conductivity using RPT. The areal map of thermal conductivity represents a 3D map that can be superimposed on a volume in the subsurface formation (such as shown in FIG. 2).

The computing system estimates (414) source rock maturity from the areal map of thermal conductivity. The source rock maturity and areal map of thermal conductivity are each used, such as during hydrocarbon exploration, for drilling risk mitigation. For example, areas with older source rock (or more mature source rock) are more likely to yield hydrocarbon deposits. When rock maturity exceeds a minimum threshold representing a required rock maturity, it is possible for that region to include hydrocarbons such as oil or gas. In some implementations, hydrocarbon exploration is performed (416) based on the determined source rock maturity for a region exceeding a threshold value. This may indicate that hydrocarbons are present or could possibly present, and can be used in combination with other data. Hydrocarbon exploration may include performing a geologic survey in a region, drilling in a region, and so forth. For example, a well can be drilled in a subsurface region with increased rock maturity. In another example, a seismic survey can be performed in the subsurface region with increased rock maturity, the seismic survey having increased sensor counts.

Figure 5A:
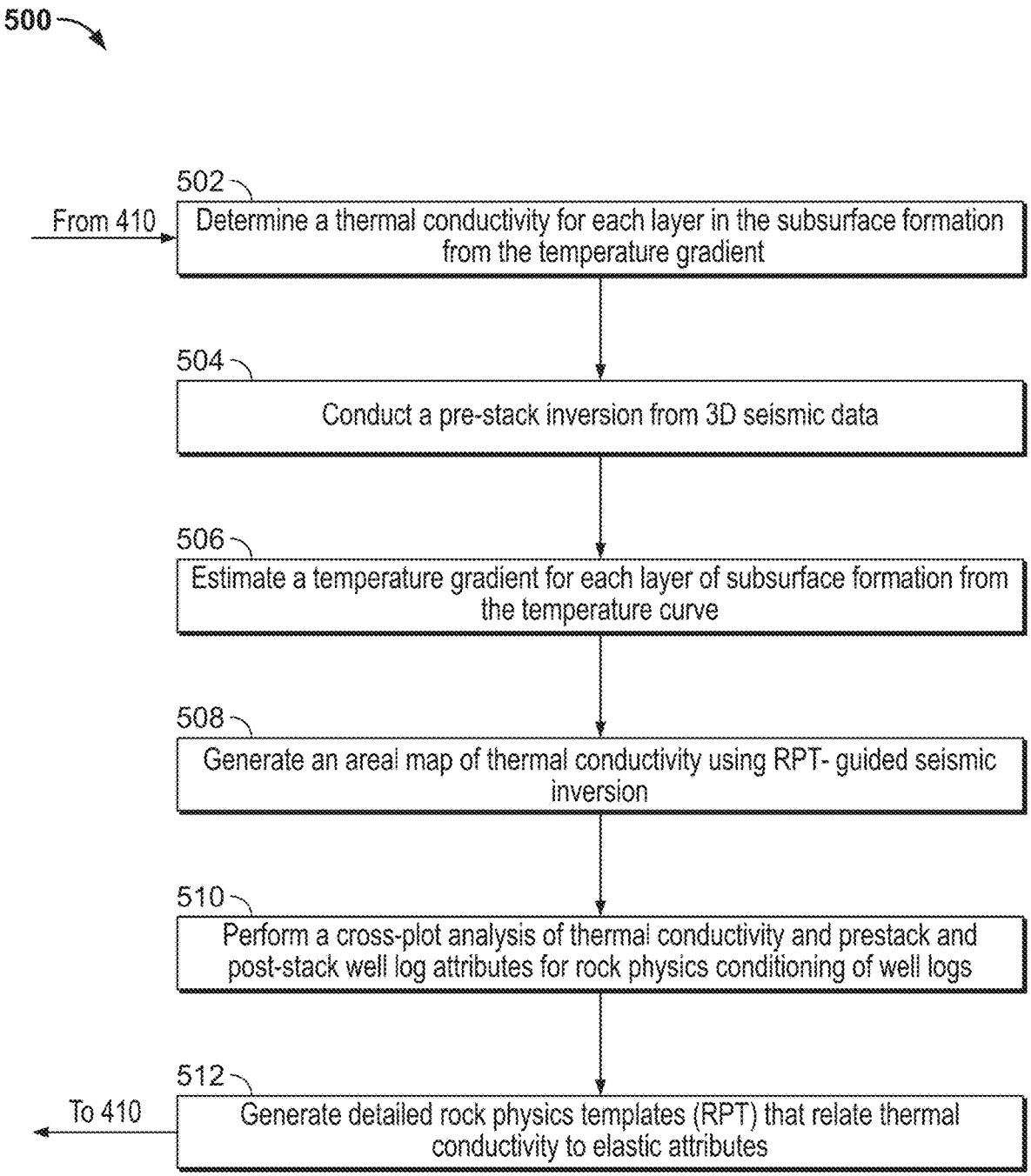
FIG. 5A illustrates a process for determining relationship between seismic data and thermal conductivity in a subsurface region (such as the 3D cube of FIG. 2).

FIG. 5A illustrates a process 500 for determining relationship between seismic data and thermal conductivity in a subsurface region (such as the 3D cube of FIG. 2). The process 500 can be performed by a data processing system, such as the computing system 700 described in relation to FIG. 7, or the computer system 124 described in relation to FIG. 1. The computing system executes a process 500 that uses each of petrophysics, rock physics and seismic inversion. The relationship can be determined for process 400. The process 500 includes determining (502) a thermal conductivity for each layer in the subsurface formation from the temperature gradient. The computing device is configured to conduct (504) a pre-stack inversion from 3D seismic data. The computing system is configured to generate (508) an areal map of thermal conductivity using RPT-guided seismic inversion. In some implementations, the process 500 includes performing (510) a cross-plot analysis of thermal conductivity and pre-stack and post-stack well log attributes for rock physics conditioning of well logs. The cross-plots are used to generate (512) a detailed rock physics template (RPT) that relates thermal conductivity to elastic attributes. To build the RPTs, the computing system is configured to gather production logs (such as fluid-structure interaction (FSI), PLT, and so forth) from sensors at the subsurface formation. In some implementations, the log data are stored in a database and accessed by the computing system. The computing system is configured to perform a quality control (QC) analysis for each logging suite for reservoir temperature at the target reservoir in the subsurface formation. The computing system determines a reservoir temperature variation and range of temperature values in the subsurface region. The computing system analyzes different open-hole logs available in the subsurface region to compile the temperature data from different log headers and determine the range of reservoir temperature from different logging tools.

In some implementations, the computing device determines a thermal conductivity based on a set of values in a lookup table depending on the type of lithology. Rather than these default values, the computing system uses seismic data to build rock physics transforms that relate elastic attributes to thermal conductivity. This is a more efficient way for mapping conductivity in a 3D sense based on hard data available (the seismic data). The computing device uses results of seismic inversion to propagate thermal conductivity values in a 3D model. For example, the computing system computes a thermal conductivity for each layer from the temperature gradient and performs a pre-stack inversion from 3D seismic data. The computing system generates an areal map of thermal conductivity using RPT-guided seismic inversion.

The horizontally and vertically spatial variant values are affected by the type of facies predicted from seismic inversion and do not depend on a set of predefined values from tables that might not even correspond to the type of geology in the subsurface formation of interest. Subsurface temperature distribution is a factor of how prospective a sedimentary basin is for further exploration. A basin modeler provided with more realistic values of thermal conductivity produces more accurate results of source rock maturity estimation. This provides insight into the likely presence of gas or oil depending on whether the source rock has reached a level of thermal maturity. Moreover, these predictions will provide more robust estimates in frontier exploration where there is limited number of borehole data. In this way, the processes 400, 500 performed by the computing system mitigate drilling risk.

Figure 5B:
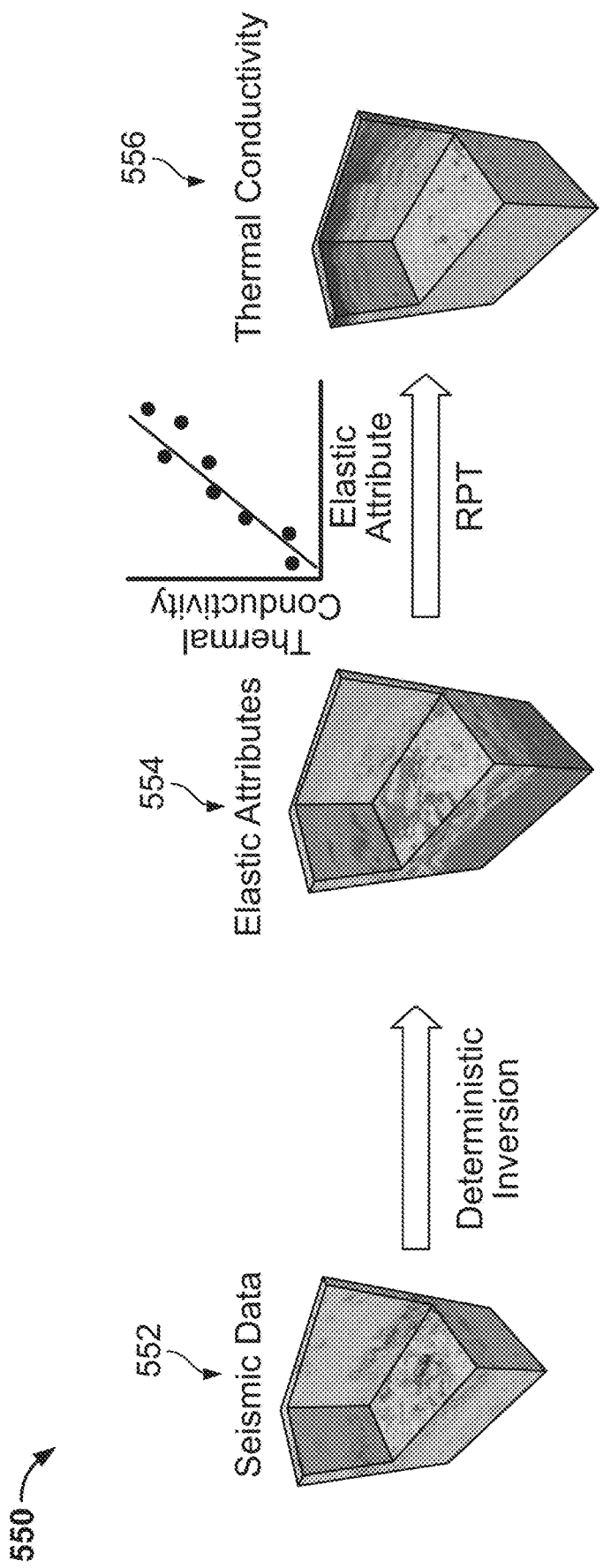
FIG. 5B illustrates a process for determining thermal conductivity within a three-dimensional cube (e.g., of FIG. 2) from seismic data acquired in that three-dimensional cube.

FIG. 5B illustrates a process 550 for determining thermal conductivity within a three-dimensional cube (e.g., of FIG. 2) from seismic data acquired in that three-dimensional cube. Seismic data 552 are inverted using a deterministic inversion algorithm to generate 3D cubes of elastic attributes. The process is comprised of three general steps. In a first step, an elastic parameter contrast inversion occurs. The elastic inversion provides an estimate of elastic parameters by the use of amplitude variations with angle data for interpretation of lithology, porosity and fluid type. In a second step, a contrast integration is performed to convert the data to elastic parameters. IN a third step, an elastic parameter inversion is performed. An objective function is minimized to estimate optimum elastic parameters. An evaluation of the objective function is conducted after every elastic parameter update until a minimum is achieved or a maximum number of updates is reached. Rock physics templates 554 are developed that each relate thermal conductivity to elastic attributes of the subsurface region represented in the seismic inversion. The seismic inversion products of elastic attributes are transformed into a 3D map 556 of thermal conductivity using the RPTs. The seismic inversion data, which is estimated from seismic data, is used to determine acoustic impedance across the 3D area. The rock physics template (RPT) is generated by relating acoustic impedance to thermal conductivity. Once the computing system has estimated the acoustic impedance, the computing system uses the rock physics relationship to propagate thermal conductivity values through the whole 3D area.

Figure 6:
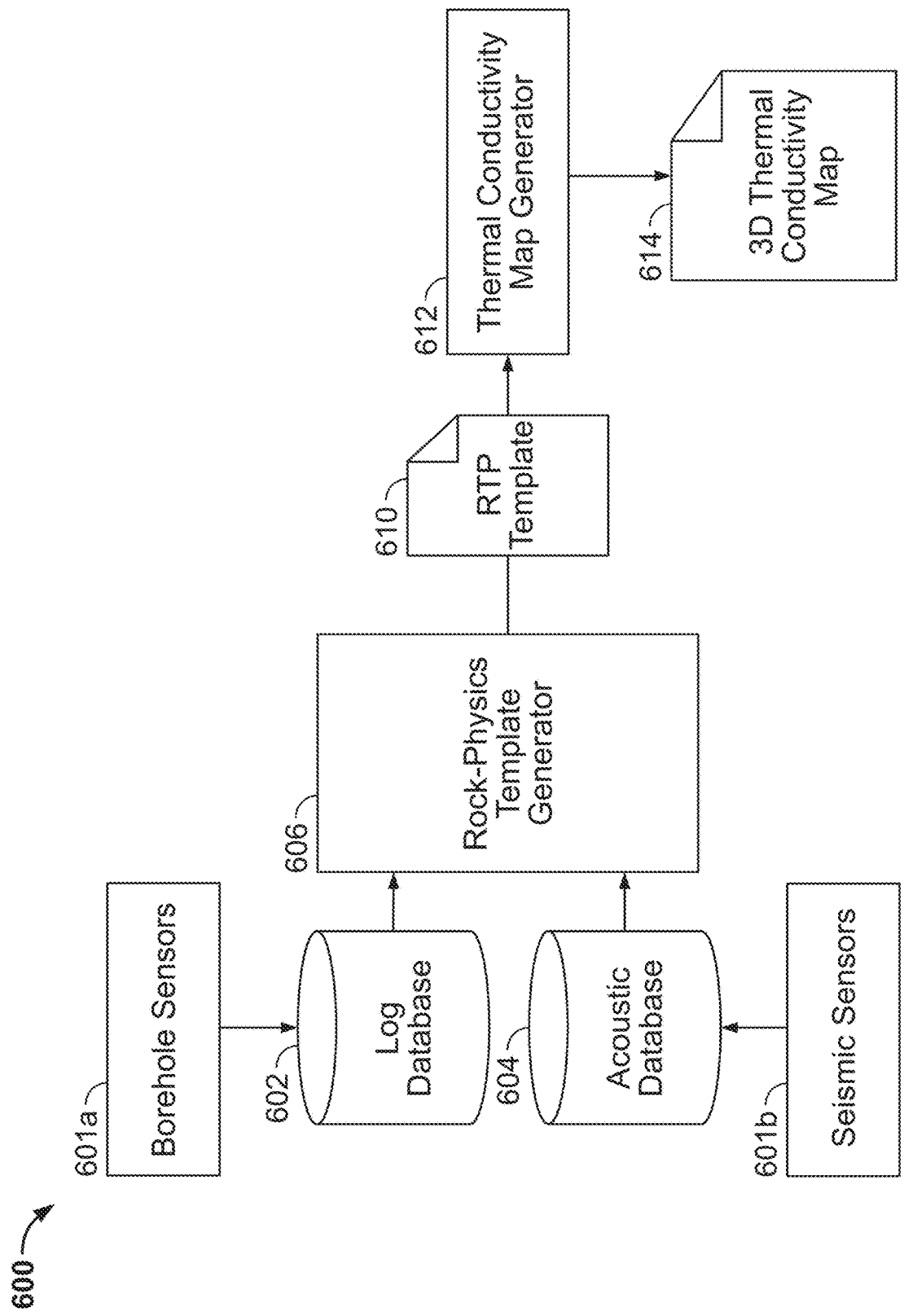
FIG. 6 illustrates a system for determining source rock maturity from seismic data and a rock physics transform that relates seismic inversion elastic attributes of the seismic data to thermal conductivity in the subsurface.

FIG. 6 illustrates a system 600 for determining source rock maturity from seismic data and a rock physics transform that relates seismic inversion elastic attributes of the seismic data to thermal conductivity in the subsurface. The system 600 includes borehole sensors 601a and seismic sensors 601b. The borehole sensors 601a are configured to provide data such as thermal data and other log data for storing in log database 602. The seismic sensors 601b provide acoustic data for storing in database 604. A rock physics template generator 606 generates the RPTs 610 as previously described. The RPTs are sent to a thermal conductivity map generator 612 configured to generate the 3D thermal conductivity maps 614 as previously described.

Figure 7:
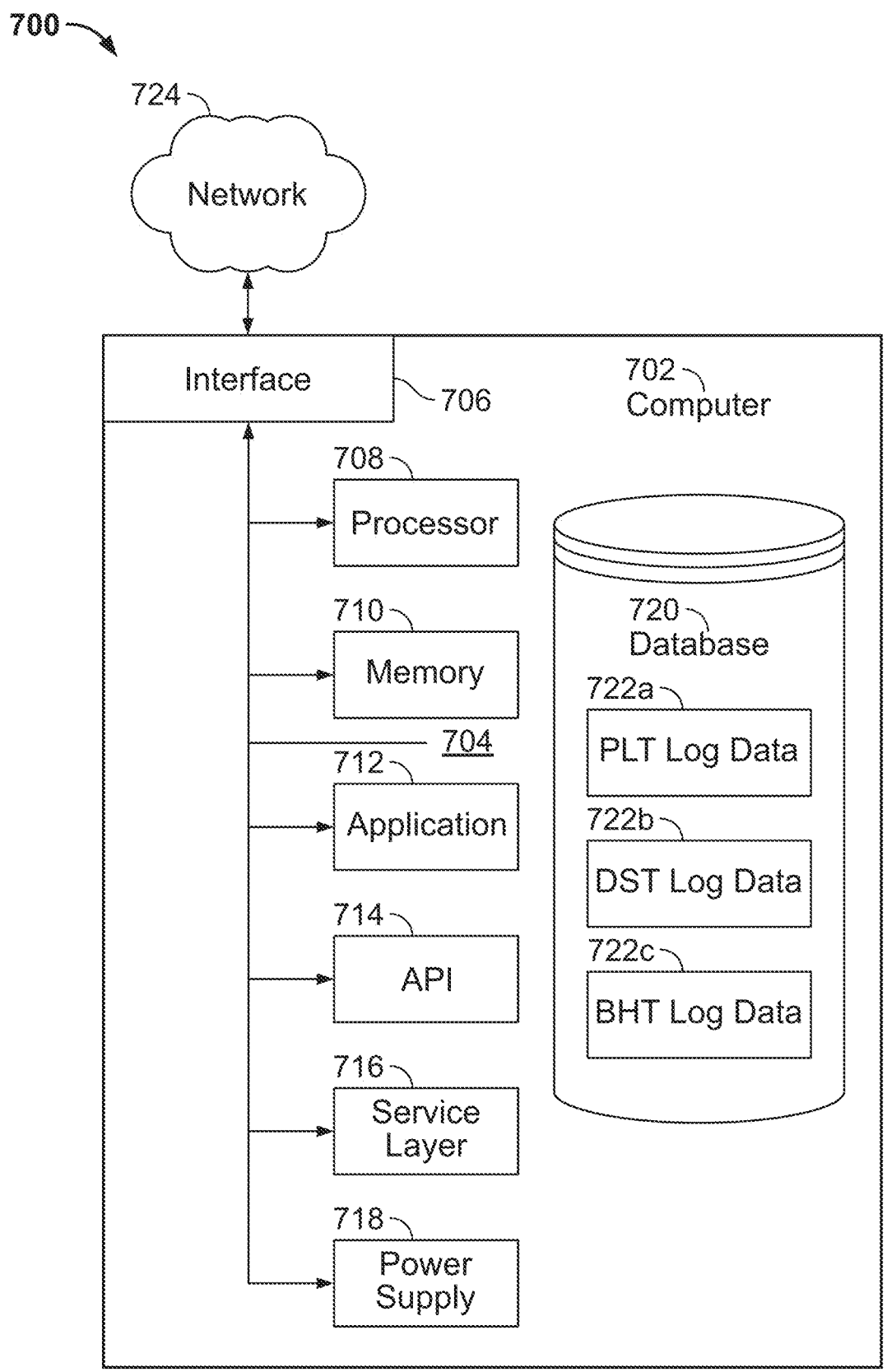
FIG. 7 is a block diagram illustrating an example computer system used to provide computational functionalities associated with described algorithms, methods, functions, processes, flows, and procedures as described in the present specification, according to some implementations of the present specification.

FIG. 7 is a block diagram of an example computer system 700 used to provide computational functionalities associated with described algorithms, methods, functions, processes, flows, and procedures described in the present specification, according to some implementations of the present specification such as the data processing system 800 described in relation to FIG. 8. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present specification. The illustrated computer 702 is communicably coupled with a network 724. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 724 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 704. In some implementations, any or all of the components of the computer 702, including hardware or software components, can interface with each other or the interface 706 (or a combination of both) over the system bus 704. Interfaces can use an application programming interface (API) 714, a service layer 716, or a combination of the API 714 and service layer 716. The API 714 can include specifications for routines, data structures, and object classes. The API 714 can be either computer-language independent or dependent. The API 714 can refer to a complete interface, a single function, or a set of APIs.

The service layer 716 can provide software services to the computer 702 and other components (whether illustrated or not) that are communicably coupled to the computer 702. The functionality of the computer 702 can be accessible for all service consumers using this service layer. Software services, such as those provided by the service layer 716, can provide reusable, defined functionalities through a defined interface. For example, the interface can be software written in JAVA, C++, or a language providing data in extensible markup language (XML) format. While illustrated as an integrated component of the computer 702, in alternative implementations, the API 714 or the service layer 716 can be stand-alone components in relation to other components of the computer 702 and other components communicably coupled to the computer 702. Moreover, any or all parts of the API 714 or the service layer 716 can be implemented as child or sub-modules of another software module, enterprise application, or hardware module without departing from the scope of the present specification.

The computer 702 includes an interface 706. Although illustrated as a single interface 706 in FIG. 7, two or more interfaces 706 can be used according to particular needs, desires, or particular implementations of the computer 702 and the described functionality. The interface 706 can be used by the computer 702 for communicating with other systems that are connected to the network 724 (whether illustrated or not) in a distributed environment. Generally, the interface 706 can include, or be implemented using, logic encoded in software or hardware (or a combination of software and hardware) operable to communicate with the network 724. More specifically, the interface 706 can include software supporting one or more communication protocols associated with communications. As such, the network 724 or the interface's hardware can be operable to communicate physical signals within and outside of the illustrated computer 702.

The computer 702 includes a processor 708. Although illustrated as a single processor 708 in FIG. 7, two or more processors 708 can be used according to particular needs, desires, or particular implementations of the computer 702 and the described functionality. Generally, the processor 708 can execute instructions and can manipulate data to perform the operations of the computer 702, including operations using algorithms, methods, functions, processes, flows, and procedures as described in the present specification.

The computer 702 also includes a database 720 that can hold data for the computer 702 (such as log data 722a, 722b, 722c) and other components connected to the network 724 (whether illustrated or not). For example, database 720 can be an in-memory, conventional, or a database storing data consistent with the present specification. In some implementations, database 720 can be a combination of two or more different database types (for example, hybrid in-memory and conventional databases) according to particular needs, desires, or particular implementations of the computer 702 and the described functionality. Although illustrated as a single database 720 in FIG. 7, two or more databases (of the same, different, or combination of types) can be used according to particular needs, desires, or particular implementations of the computer 702 and the described functionality. While database 720 is illustrated as an internal component of the computer 702, in alternative implementations, database 720 can be external to the computer 702.

The computer 702 also includes a memory 710 that can hold data for the computer 702 or a combination of components connected to the network 724 (whether illustrated or not). Memory 710 can store any data consistent with the present specification. In some implementations, memory 710 can be a combination of two or more different types of memory (for example, a combination of semiconductor and magnetic storage) according to particular needs, desires, or particular implementations of the computer 702 and the described functionality. Although illustrated as a single memory 710 in FIG. 7, two or more memories 710 (of the same, different, or combination of types) can be used according to particular needs, desires, or particular implementations of the computer 702 and the described functionality. While memory 710 is illustrated as an internal component of the computer 702, in alternative implementations, memory 710 can be external to the computer 702.

The application 712 can be an algorithmic software engine providing functionality according to particular needs, desires, or particular implementations of the computer 702 and the described functionality. For example, application 712 can serve as one or more components, modules, or applications. Further, although illustrated as a single application 712, the application 712 can be implemented as multiple applications 708 on the computer 702. In addition, although illustrated as internal to the computer 702, in alternative implementations, the application 712 can be external to the computer 702.

The computer 702 can also include a power supply 718. The power supply 718 can include a rechargeable or non-rechargeable battery that can be configured to be either user- or non-user-replaceable. In some implementations, the power supply 718 can include power-conversion and management circuits, including recharging, standby, and power management functionalities. In some implementations, the power-supply 718 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 724. Further, the terms "client," "user," and other appropriate terminology can be used interchangeably, as appropriate, without departing from the scope of the present specification. Moreover, the present specification contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present specification contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present specification can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the scope of the data processing system described herein. Accordingly, other embodiments are within the scope of the following claims.

What is claimed is:

1. A method for modeling basin geology in a subsurface region, the method comprising:
receiving seismic data representing acoustic signals that are reflected from regions of the subsurface region;
receiving thermal data representing temperature values that are mapped to locations in the subsurface region;
accessing a rock physics transform (RPT) that relates thermal conductivity in rock to subsurface formations;
determining, by applying the RPT to the thermal data and the seismic data, a relationship between the seismic data and the temperature values for each of the locations in the subsurface region;
generating, based on the relationship for each of the locations, a three-dimensional (3D) map of thermal conductivity in the subsurface region,
wherein determining the relationship and generating the 3D map comprises:
performing a seismic inversion on the seismic data; and
generating, based on the seismic inversion, values for one or more elastic properties of the subsurface region, wherein the relationship between the seismic data and the temperature values of the thermal data for each of the locations in the subsurface region comprises a relationship between the thermal conductivity of the subsurface region and the one or more elastic properties
determining, based on the seismic inversion, an acoustic impedance across the subsurface region;
generating a RPT based on relating the acoustic impedance to thermal conductivity in the subsurface region; and
based on the RPT, propagate thermal conductivity values through the subsurface region to form the 3D map of thermal conductivity; and
based on the 3D map of thermal conductivity, identifying at least one area comprising source rock having a threshold maturity, the threshold maturity being indicative of potential hydrocarbons in the subsurface region.

2. The method of claim 1, further comprising:
determining a temperature curve in a zone of interest based on the potential field values; and
estimating a temperature gradient for each layer of a subsurface formation in the subsurface region from the temperature curve,
wherein the relationship between the seismic data and the potential field values for each of the locations in the subsurface region is based on the temperature gradient for a respective layer of subsurface formation.

3. The method of claim 2, further comprising:
determining a thermal conductivity for each layer of the subsurface formation from the temperature gradient for the respective layer of the subsurface formation.

4. The method of claim 1, wherein the one or more elastic properties comprise lithology, porosity, water saturation, permeability and density.

5. The method of claim 1, wherein the thermal data comprises production logging tool (PLT) data, downhole seismic testing (DST) data, bottom hole temperature (BHT) log data, or a combination thereof.

6. A system for modeling basin geology in a subsurface region, the system comprising:
at least one processor; and
at least one memory storing instructions that, when executed by the at least one processor, cause the at least one processor to perform operations comprising:
receiving seismic data representing acoustic signals that are reflected from regions of the subsurface region;
receiving thermal data representing temperature values that are mapped to locations in the subsurface region;
accessing a rock physics transform (RPT) that relates thermal conductivity in rock to subsurface formations;
determining, by applying the RPT to the thermal data and the seismic data, a relationship between the seismic data and the temperature values for each of the locations in the subsurface region;
generating, based on the relationship for each of the locations, a three-dimensional (3D) map of thermal conductivity in the subsurface region;
wherein determining the relationship and generating the 3D map comprises:
performing a seismic inversion on the seismic data; and
generating, based on the seismic inversion, values for one or more elastic properties of the subsurface region, wherein the relationship between the seismic data and the temperature values of the thermal data for each of the locations in the subsurface region comprises a relationship between the thermal conductivity of the subsurface region and the one or more elastic properties
determining, based on the seismic inversion, an acoustic impedance across the subsurface region;
generating a RPT based on relating the acoustic impedance to thermal conductivity in the subsurface region; and
based on the RPT, propagate thermal conductivity values through the subsurface region to form the 3D map of thermal conductivity; and
based on the 3D map of thermal conductivity, identifying at least one area comprising source rock having a threshold maturity, the threshold maturity being indicative of potential hydrocarbons in the subsurface region.

7. The system of claim 6, further comprising:
determining a temperature curve in a zone of interest based on the potential field values; and
estimating a temperature gradient for each layer of a subsurface formation in the subsurface region from the temperature curve,
wherein the relationship between the seismic data and the potential field values for each of the locations in the subsurface region is based on the temperature gradient for a respective layer of subsurface formation.

8. The system of claim 7, further comprising:
determining a thermal conductivity for each layer of the subsurface formation from the temperature gradient for the respective layer of the subsurface formation.

9. The system of claim 8, wherein the one or more elastic properties comprise lithology, porosity, water saturation, permeability and density.

10. The system of claim 6, wherein the potential fields thermal data comprises production logging tool (PLT) data, downhole seismic testing (DST) data, bottom hole temperature (BHT) log data, or a combination thereof.

11. One or more non-transitory computer-readable media storing instructions for modeling basin geology in a subsurface region, the instructions, when executed by at least one processor, being configured to cause the at least one processor to perform operations comprising:

receiving seismic data representing acoustic signals that are reflected from regions of the subsurface region;

receiving thermal data representing temperature values that are mapped to locations in the subsurface region;

accessing a rock physics transform (RPT) that relates thermal conductivity in rock to subsurface formations;

determining, by applying the RPT to the thermal data and the seismic data, a relationship between the seismic data and the temperature values for each of the locations in the subsurface region;

generating, based on the relationship for each of the locations, a three-dimensional (3D) map of thermal conductivity in the subsurface region;

wherein determining the relationship and generating the 3D map comprises:

performing a seismic inversion on the seismic data; and generating, based on the seismic inversion, values for one or more elastic properties of the subsurface region, wherein the relationship between the seismic data and the temperature values of the thermal data for each of the locations in the subsurface region comprises a relationship between the thermal conductivity of the subsurface region and the one or more elastic properties determining, based on the seismic inversion, an acoustic impedance across the subsurface region;

generating a RPT based on relating the acoustic impedance to thermal conductivity in the subsurface region; and based on the RPT, propagate thermal conductivity values through the subsurface region to form the 3D map of thermal conductivity; and based on the 3D map of thermal conductivity, identifying at least one area comprising source rock having a threshold maturity, the threshold maturity being indicative of potential hydrocarbons in the subsurface region.

12. The one or more non-transitory computer-readable media of claim 11, further comprising:

determining a temperature curve in a zone of interest based on the potential field values; and estimating a temperature gradient for each layer of a subsurface formation in the subsurface region from the temperature curve, wherein the relationship between the seismic data and the potential field values for each of the locations in the subsurface region is based on the temperature gradient for a respective layer of subsurface formation.

13. The one or more non-transitory computer-readable media of claim 12, further comprising:

determining a thermal conductivity for each layer of the subsurface formation from the temperature gradient for the respective layer of the subsurface formation.

14. The one or more non-transitory computer-readable media of claim 11, wherein the one or more elastic properties comprise lithology, porosity, water saturation, permeability and density.

15. The one or more non-transitory computer-readable media of claim 11, wherein the thermal data comprises production logging tool (PLT) data, downhole seismic testing (DST) data, bottom hole temperature (BHT) log data, or a combination thereof.

* * * * *